US011982892B1

(12) United States Patent
Lou et al.

(10) Patent No.: US 11,982,892 B1
(45) Date of Patent: May 14, 2024

(54) DISPLAY PANEL AND DISPLAY DEVICE

(71) Applicant: Shanghai Tianma Micro-electronics Co., Ltd., Shanghai (CN)

(72) Inventors: Tenggang Lou, Shanghai (CN); Jian Zhao, Shanghai (CN); Qiongqin Mao, Shanghai (CN); Huijun Jin, Shanghai (CN); Ximin Qi, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 18/218,717

(22) Filed: Jul. 6, 2023

(30) Foreign Application Priority Data

Apr. 12, 2023 (CN) .......................... 202310390197.3

(51) Int. Cl.
G02F 1/1333 (2006.01)
G02F 1/1362 (2006.01)

(52) U.S. Cl.
CPC .. G02F 1/133382 (2013.01); G02F 1/136286 (2013.01)

(58) Field of Classification Search
None
See application file for complete search history.

(56) References Cited

U.S. PATENT DOCUMENTS

| 2021/0011329 A1* | 1/2021 | Kuo ................... G02F 1/133382 |
| 2021/0013083 A1* | 1/2021 | Zhao ..................... H01L 25/167 |

FOREIGN PATENT DOCUMENTS

| CN | 114442357 A | 5/2022 |
| KR | 1020170073069 A | 6/2017 |

* cited by examiner

*Primary Examiner* — Shan Liu
(74) *Attorney, Agent, or Firm* — Anova Law Group, PLLC

(57) ABSTRACT

A display panel and a display device are provided. The display panel includes a regular display region and an irregular display region. The display panel also includes a first substrate and a second substrate that are disposed opposite to each other, a liquid crystal layer disposed between the first and second substrates, and a heating electrode layer stacked with the liquid crystal layer. In the irregular display region, the heating electrode layer includes a plurality of first heating wires, and each first heating wire is connected between a first electrode wire and a second electrode wire. At least one first heating wire serves as a target heating wire including a first sub-segment and a second sub-segment. The first sub-segment has a resistance per unit length smaller than the second sub-segment, and the first sub-segment is closer to the regular display region than the second sub-segment.

20 Claims, 10 Drawing Sheets

DISPLAY PANEL AND DISPLAY DEVICE

CROSS-REFERENCE TO RELATED APPLICATION

This application claims the priority of Chinese patent application No. 202310390197.3, filed on Apr. 12, 2023, the entirety of which is incorporated herein by reference.

FIELD

The present disclosure generally relates to the field of display technology and, more particularly, relates to a display panel and a display device.

BACKGROUND

As display technology continues to develop, people have increasingly high requirements for display devices. In some special applications of display devices, when the display device is started at a low temperature, it is desired that the display device can quickly reach normal operation, which requires the display device to respond quickly at the low temperature. However, the existing display device has the problem of uneven inside temperature when responding to the low temperature.

SUMMARY

One aspect of the present disclosure provides a display panel. The display panel includes a regular display region and an irregular display region. The display panel also includes a first substrate and a second substrate that are disposed opposite to each other, a liquid crystal layer disposed between the first substrate and the second substrate, and a heating electrode layer stacked with the liquid crystal layer. In the irregular display region, the heating electrode layer includes a plurality of first heating wires, and each of the plurality of first heating wires is connected between a first electrode wire and a second electrode wire. The first electrode wire and the second electrode wire are applied with different voltages. At least one of the plurality of first heating wires serves as a target heating wire, and the target heating wire includes a first sub-segment and a second sub-segment. A resistance per unit length of the first sub-segment is smaller than a resistance per unit length of the second sub-segment, and the first sub-segment is closer to the regular display region than the second sub-segment.

Another aspect of the present disclosure provides a display device. The display device includes a display panel. The display panel includes a regular display region and an irregular display region. The display panel also includes a first substrate and a second substrate that are disposed opposite to each other, a liquid crystal layer disposed between the first substrate and the second substrate, and a heating electrode layer stacked with the liquid crystal layer. In the irregular display region, the heating electrode layer includes a plurality of first heating wires, and each of the plurality of first heating wires is connected between a first electrode wire and a second electrode wire. The first electrode wire and the second electrode wire are applied with different voltages. At least one of the plurality of first heating wires serves as a target heating wire, and the target heating wire includes a first sub-segment and a second sub-segment. A resistance per unit length of the first sub-segment is smaller than a resistance per unit length of the second sub-segment, and the first sub-segment is closer to the regular display region than the second sub-segment.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Figure 1:
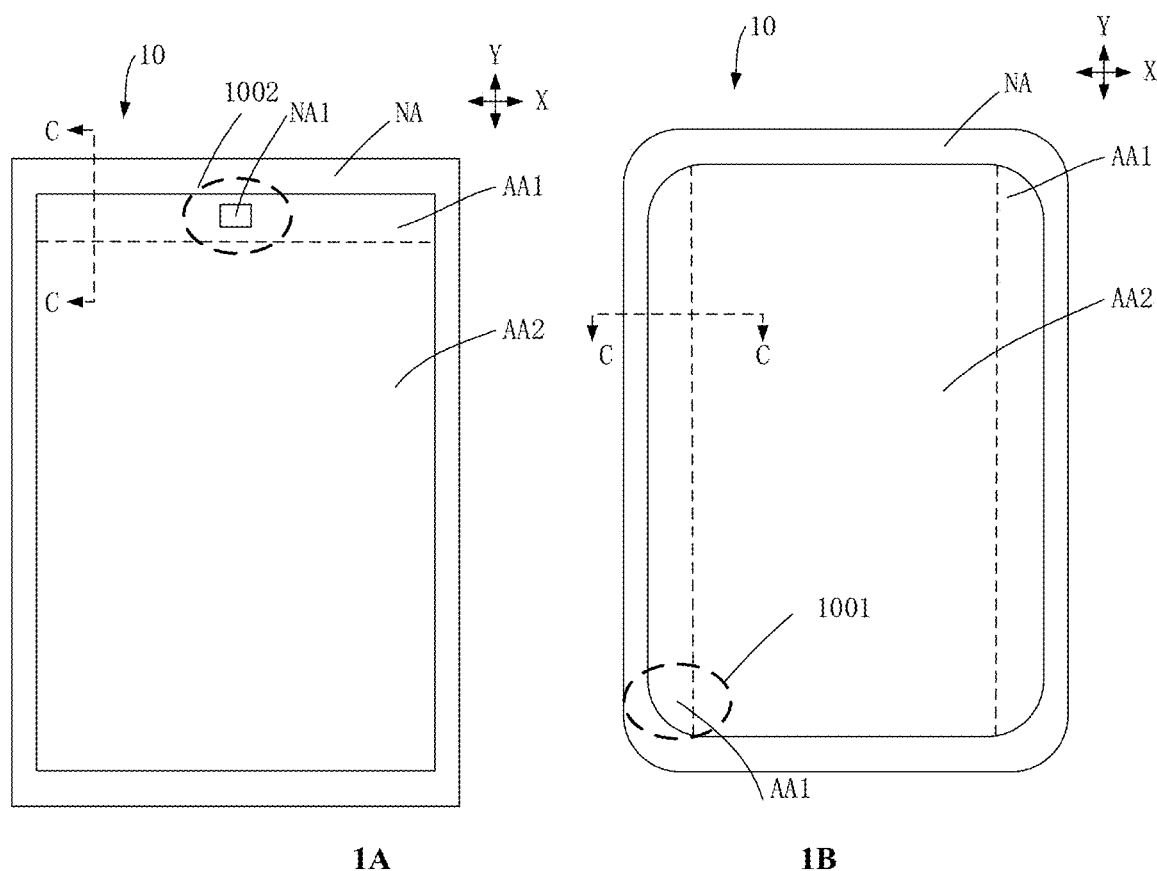
FIG. 1 illustrates a schematic diagram of an exemplary display panel consistent with disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

The following description provides many specific details to facilitate a thorough understanding of the present disclosure. However, the present disclosure may be implemented in other ways that are different from those described herein, and those skilled in the art may promote the present disclosure in a similar manner without departing from the scope of the present disclosure. Therefore, the specific embodiments disclosed herein are not limiting to the present disclosure.

Secondly, the present disclosure is described in detail in conjunction with the accompanying drawings. In describing the specific embodiments of the present disclosure, for illustrative purposes, cross-sectional views of device structures are not drawn to scale, and the drawings are only examples and should not limit the scope of the present disclosure. In addition, three-dimensional spatial dimensions of length, width, and depth should be included in actual production.

As described in the background technology, with the continuous development of display technology, people have increasingly high requirements for display devices. In some special applications of display devices, when the display device is started at a low temperature, it is desired that the display device can quickly reach normal operation, which requires the display device to respond quickly at the low temperature. However, the existing display device has the problem of uneven inside temperature when responding to the low temperature. In practical applications, one or more heating electrodes may be provided in the display device to achieve rapid response of the display device at the low temperature. The heating electrode is often located in the display region. Because the edge of the display region, especially the irregular edge of the display region, is close to the edge of the display device and the irregular edge has a long extension path, the heat transfer between the edge of display region and the outside is fast, and the heat transfer of the irregular edge is even faster, which leads to a substantially low temperature near the irregular edge of the display region and a substantially high temperature near the central position of the display region. The temperature difference at different positions of the display region is substantially large, which easily causes poor display of the display panel.

The present disclosure provides a display panel and a display device. The display panel may include a regular display region and an irregular display region. The display panel may also include a first substrate and a second substrate that are disposed opposite to each other, a liquid crystal layer located between the first substrate and the second substrate, and a heating electrode layer stacked with the liquid crystal layer. The heating electrode layer may heat the liquid crystal layer. In the irregular display region, the heating electrode layer may include a plurality of first heating wires, and each of the plurality of first heating wires may be connected between a first electrode wire and a second electrode wire. The first electrode wire and the second electrode wire may be applied with different voltages, such that the heating electrode layer may generate heat when being powered on. At least one of the plurality of first heating wires may serve as a target heating wire, and the target heating wire may include a first sub-segment and a second sub-segment. A resistance per unit length of the first sub-segment may be smaller than a resistance per unit length of the second sub-segment. The first sub-segment may be closer to the regular display region than the second sub-segment. In other words, for the first heating wire in the irregular display region, the same first heating wire may have non-uniform resistance per unit length. The first sub-segment close to the regular display region may have a substantially small resistance per unit length, while the second sub-segment far from the regular display region may have a substantially large resistance per unit length. Therefore, when the same current is applied to different positions on the same heating wire, the second sub-segment far from the regular display region may have a higher heating power compared to the first sub-segment close to the regular display region, which may improve the heating uniformity at different positions of the irregular display region when there is a substantially large heat dissipation in a position far from the regular display region.

To better understand the technical solution and technical effects of the present disclosure, specific implementation embodiments may be described in detail with reference to the accompanying drawings.

Figure 2:
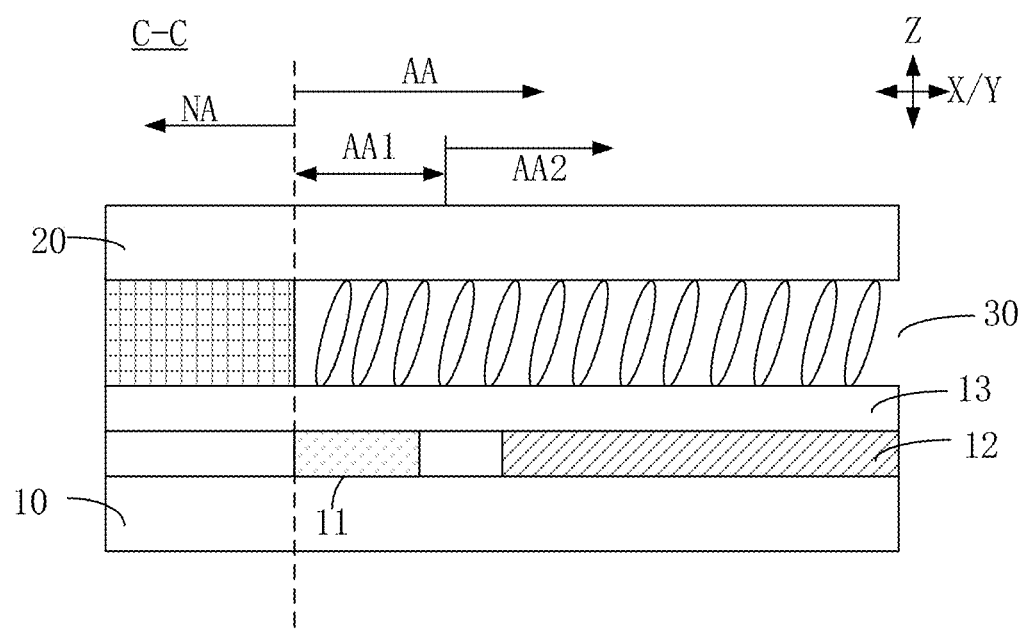
FIG. 2 illustrates a CC'-sectional view of the display panel in FIG. 1 consistent with disclosed embodiments of the present disclosure.

FIG. 1 illustrates a schematic diagram of a display panel consistent with disclosed embodiments of the present disclosure; and FIG. 2 illustrates a CC'-sectional view of the display panel in FIG. 1. Referring to FIG. 1 and FIG. 2, the display panel 10 may include a display region AA and a non-display region NA surrounding the display region. The display region AA may be provided with display elements (also referred to as pixel elements) for displaying the to-be-displayed content. The display elements may include, for example, liquid crystal display elements, and the display elements may be arranged in an array to form a pixel array in the display panel 10. The non-display region NA may be configured to set up a circuit structure for driving the display panel 10 to display. The non-display region NA may often include a border region surrounding the display region AA, and the border region may surround the display region AA. The display region AA may merely include a region provided with display elements, or may include a substantially narrow edge region outside the region provided with display elements.

When the display elements include liquid crystal display elements, the display panel 10 may function as a liquid crystal display panel, and the display device including the liquid crystal display panel may function as a liquid crystal display (LCD). The LCD may have become increasingly widely used due to their advantages of low power consumption, miniaturization, and lightness. However, the performance of the liquid crystal in the LCD is greatly affected by temperature. At temperatures below zero degree, due to the decrease of temperature, the viscosity coefficient of the liquid crystal increases, the response time of the liquid crystal increases, the response speed of the liquid crystal decreases, and the screen display becomes slow or even unable to be displayed.

Due to the diversity of the shape and function of the display panel 10, the shape of the display region AA may often be non-regular in certain embodiments, and the display region AA may have an irregular shape determined by the shape of the display panel 10 and the shape of other components in the display panel 10. For example, when the display panel 10 has rounded corners, the display region AA may also have rounded corners. In another embodiment, when the display panel 10 is provided with components such as a camera, the display region AA may be disposed adjacent to these components, and thus may exhibit an irregular shape.

Therefore, in the disclosed embodiments, the display region AA may be divided into a regular display region AA2 and an irregular display region AA1. The regular display region AA2 and the irregular display region AA1 may together form the display region. The quantity of regular display regions AA2 may be one or more, and the quantity of irregular display regions AA1 may be one or more.

As a principle of division, one or more regular display regions AA2 may be designated in the display region, and the region outside of the regular display regions AA2 may serve as the irregular display regions AA1. When dividing the display region, the number of regular display regions AA2 may be set as small as possible, while the area of the regular display regions AA2 may be set as large as possible. As another principle of division, the display elements in the display panel 10 may be arranged in an array along a first direction, the wire segments in the first direction may be used as the boundary between the regular display region AA2 and the irregular display region AA1. As shown in FIG. 1, when the display elements are arranged in an array along the first direction and a second direction, the first direction may be denoted as a column direction (Y direction), and the second direction may be denoted as a row direction (X direction). The boundary between the regular display region AA2 and the irregular display region AA1 in FIG. 1A may be along the second direction, while the boundary between the regular display region AA2 and the irregular display region AA1 in in FIG. 1B may be along the first direction.

The irregular display region AA1 may be located at the R corner or the beveled corner of the display panel 10, such as a corner region 1001, and may also include groove NA1, etc., such as a groove region 1002. The shape of the groove NA1 may include circular, polygonal, or any other shape. The irregular display region AA1 may also include at least one strip structure in the corner region 1001 or the groove region 1002. The shape of the regular display region AA2 may include a circular or polygonal flat structure. In one embodiment, the regular display region AA2 may include a rectangular structure. The shape of the irregular display region AA1 may be varied, such as polygonal, arc-shaped, annular, a strip with at least one rounded corner, or any other irregular shape. In one embodiment, the irregular display region AA1 may be extended along a curved path to form a semi-circular or quarter-annular shape. For the corner region 1001 and the groove region 1002, different division methods of the display region may be used to separately set these two regions, which may be explained in different embodiments later.

The light-emitting direction of the display panel 10 may be denoted as the Z-direction. As shown in FIG. 2, the display panel 10 may include a first substrate 10 and a second substrate 20 that are disposed opposite to each other. The first substrate 10 may be an array substrate, and the second substrate 20 may be an opposing substrate. In another embodiment, the first substrate 10 may be an opposing substrate, and the second substrate 20 may be an array substrate. The array substrate may include thin-film transistors, pixel electrodes, and common electrodes. The pixel electrodes and the common electrodes may be arranged in a same layer with a certain distance therebetween, or may be arranged in different layers. The opposing substrate may include a color filter layer.

The display panel 10 may also include a liquid crystal layer 30 located between the first substrate 10 and the second substrate 20, and a heating electrode layer stacked with the liquid crystal layer 30. The heating electrode layer may be configured to heat the liquid crystal layer 30. The heating electrode layer may be located on a side of the first substrate 10 or the second substrate 20 away from the liquid crystal layer 30, or on a side of the first substrate 10 or the second substrate 20 close to the liquid crystal layer 30. In one embodiment, the heating electrode layer may be merely disposed on the first substrate 10 or the second substrate 20, or may be disposed on both the first substrate 10 and the second substrate 20. A thermally-conductive electrically-insulating layer 13 may be provided between the heating electrode layer and the liquid crystal layer 30, to prevent the display panel 10 from having bad spots caused by direct heating of the liquid crystal layer 30 by the heating electrode layer. The heating electrode layer may include a patterned electrode layer, and the gaps in the patterned electrode layer may be filled with insulation materials.

In the irregular display region AA1, the heating electrode layer may include a plurality of first heating wires 11, and each of the plurality of first heating wires 11 may be connected between a first electrode wire and a second electrode wire. The first electrode wire and the second electrode wire may be used to apply different voltages, such that the first heating wires 11 may be subjected to a voltage difference to generate heat when the first electrode wire and the second electrode wire are applied with different voltages. The first electrode wire and the second electrode wire may be denoted as V1 and V2, respectively. Among the first electrode wire V1 and the second electrode wire V2, the wire applied with a higher voltage (VGH) may be referred to as a high voltage wire, and the wire applied with a lower voltage (VGL) may be referred to as a low voltage wire. The first electrode wire V1 and the second electrode wire V2 may also be referred to as heating terminals. Due to the fact that the extension direction of the first heating wire 11 is often related to the shape of the irregular display region AA1, the first heating wire 11 may have a portion near the edge of the display panel 10 and another portion near the center of the display panel 10. The position near the edge of the display panel 10 may often have more heat dissipation, such that the first heating wire 11 in such position may need to have a higher heating efficiency, to ensure that the temperature of different positions in the irregular display region AA1 is roughly the same.

Because the irregular display region AA1 is closer to the edge of the display panel 10 compared to the regular display region AA2, the portion near the edge of the display panel 10 may often be substantially far away from the regular display region AA2, while the portion near the center of the display panel 10 may often be substantially close to the regular display region AA2. Therefore, at least one of the plurality of first heating wires 11 may be selected as a target heating wire. The target heating wire may include a first sub-segment and a second sub-segment. The first sub-segment may be closer to the regular display region AA2 than the second sub-segment, and the resistance per unit length of the first sub-segment may be smaller than the resistance per unit length of the second sub-segment. For example, a wire width of the first sub-segment may be larger than a wire width of the second sub-segment, or a sheet resistance of the first sub-segment may be smaller than a sheet resistance of the second sub-segment. Because the first sub-segment and the second sub-segment belong to a same target heating wire, the first sub-segment and the second sub-segment may be made of a same material and have a same thickness for saving production cost. Therefore, the first sub-segment and the second sub-segment may be designed to be made of a same material and have a same thickness, and the wire width of the first sub-segment may be larger than the wire width of the second sub-segment.

In other words, for the first heating wire 11 in the irregular display region AA1, the same first heating wire 11 may have non-uniform resistance per unit length. The first sub-segment near the regular display region AA2 may have a smaller resistance per unit length, while the second sub-segment far from the regular display region AA2 may have a larger resistance per unit length. Therefore, when the same current is applied to different positions on the same first heating wire, the second sub-segment far from the regular display region AA2 may have a higher heating power compared to the first sub-segment close to the regular display region AA2, which may improve the heating uniformity at different positions of the irregular display region AA1 when there is a substantially large heat dissipation in a position far from the regular display region AA2.

The heating electrode layer may be made of a transparent conductor, such as ITO or IZO, or may be made of a metal. When the heating electrode layer is transparent and conductive, the display effect of the display panel 10 may be affected as little as possible. The heating electrode layer may be on a same layer as at least one of the electrode in the thin-film transistor, pixel electrode, and common electrode on the array substrate, to multiplex the existing mask.

A ratio of the wire width of the first sub-segment over the wire width of second sub-segment may be determined according to actual conditions. For example, the wire width of the first sub-segment may be 5-1000 times of the wire width of the second sub-segment, such that the first sub-segment may effectively reduce the resistance of the target heating wire, and the position of the second sub-segment may have a substantially large partial voltage, thereby achieving a substantially large heating power at the position of the second sub-segment.

In one embodiment, as shown in FIG. 2, the heating electrode layer in the regular display region AA2 may include a plurality of second heating wires 12, and each of the plurality of second heating wires 12 may be connected between the first electrode wire V1 and the second electrode wire V2, respectively. In other words, the first heating wire 11 and the second heating wire 12 may be connected to same heating terminals, such that the second heating wire 12 may be subjected to a voltage difference to generate heat when different voltages are applied to the first electrode wire V1 and the second electrode wire V2. The plurality of second heating wires 12 may be arranged in parallel, and the arrangement direction of the plurality of second heating wires 12 may be denoted as the first direction. In other words, the plurality of second heating wires 12 may be extended along a direction perpendicular to the first direction, which may be denoted as the second direction. Both the first electrode wire V1 and the second electrode wire V2 may include portions disposed on both sides of the second heating wire 12.

In practical applications, for the sake of wiring rationality, the plurality of first heating wires 11 may also be arranged along the first direction. In other words, the arrangement direction of the plurality of first heating wires 11 may be denoted as the first direction. Therefore, the first electrode wire V1 and the second electrode wire V2 may include portions disposed on both sides of the first heating wire 11. The plurality of first heating wires 11 may be connected to different positions of the first electrode wire V1 and different positions of the second electrode wire V2.

Based on the different division methods of the regular display region AA2 and the irregular display region AA1, the regular display region AA2 and the irregular display region AA1 may have various relative positions. In practice, the division method may be determined according to the shape characteristics of the display panel 10.

In one embodiment, when the regular display region AA2 and the irregular display region AA1 are arranged along the first direction, as shown in FIGS. 3-9, the first direction may be the Y direction, and the second direction may be the X direction. In the plane formed by the X direction and the Y direction, the irregular display region AA1 may be disposed above the regular display region AA2. When the regular display region AA2 and the irregular display region AA1 are arranged along the first direction, the first heating wires 11 and the second heating wires 12 may be independent of each other. Such division method may be applied to the case where the display panel 10 includes a groove region 1002, and the disposure method of the first heating wires 11 in the groove region 1002 may be determined according to such division method.

Figure 9:
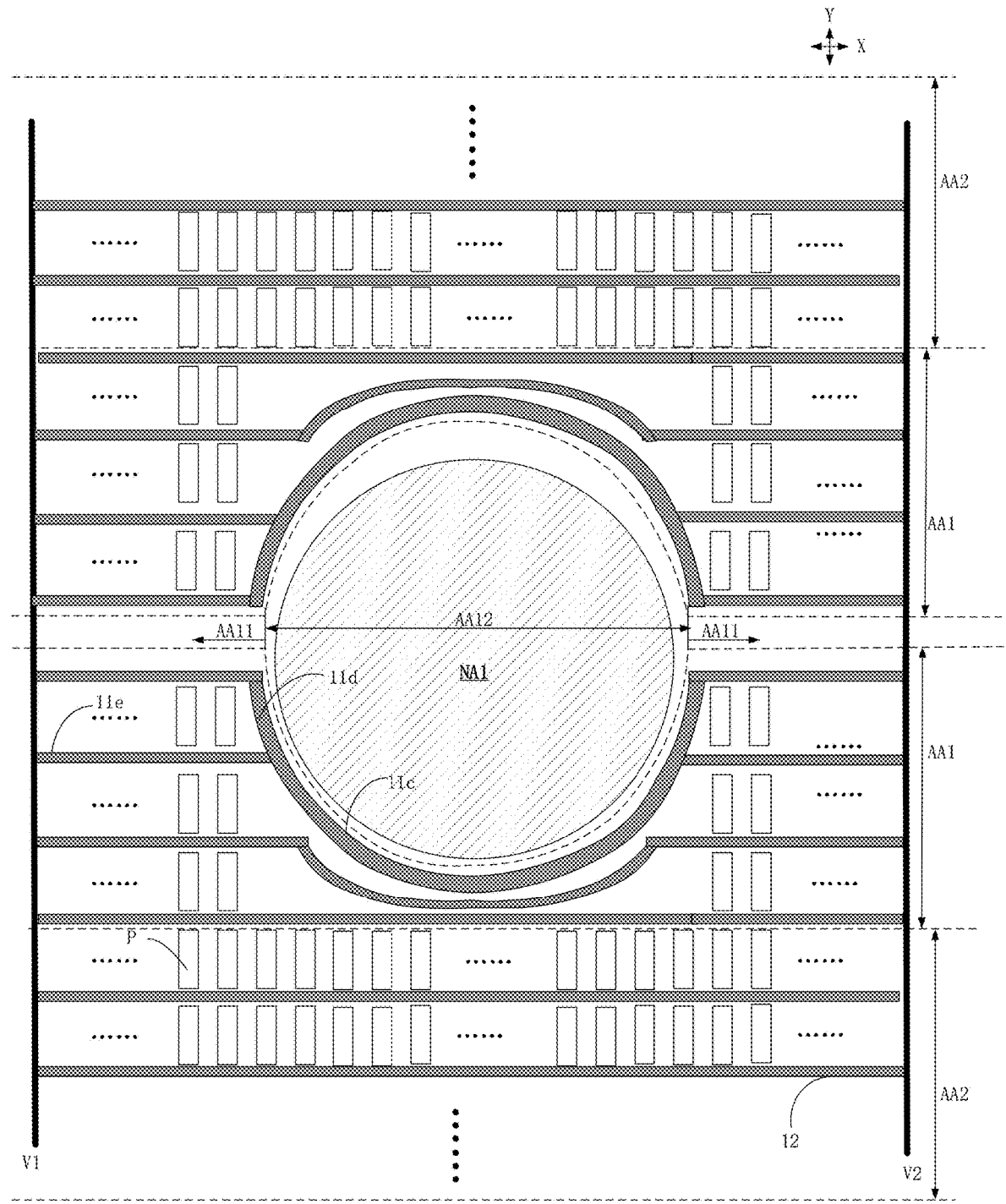
Figure 10:
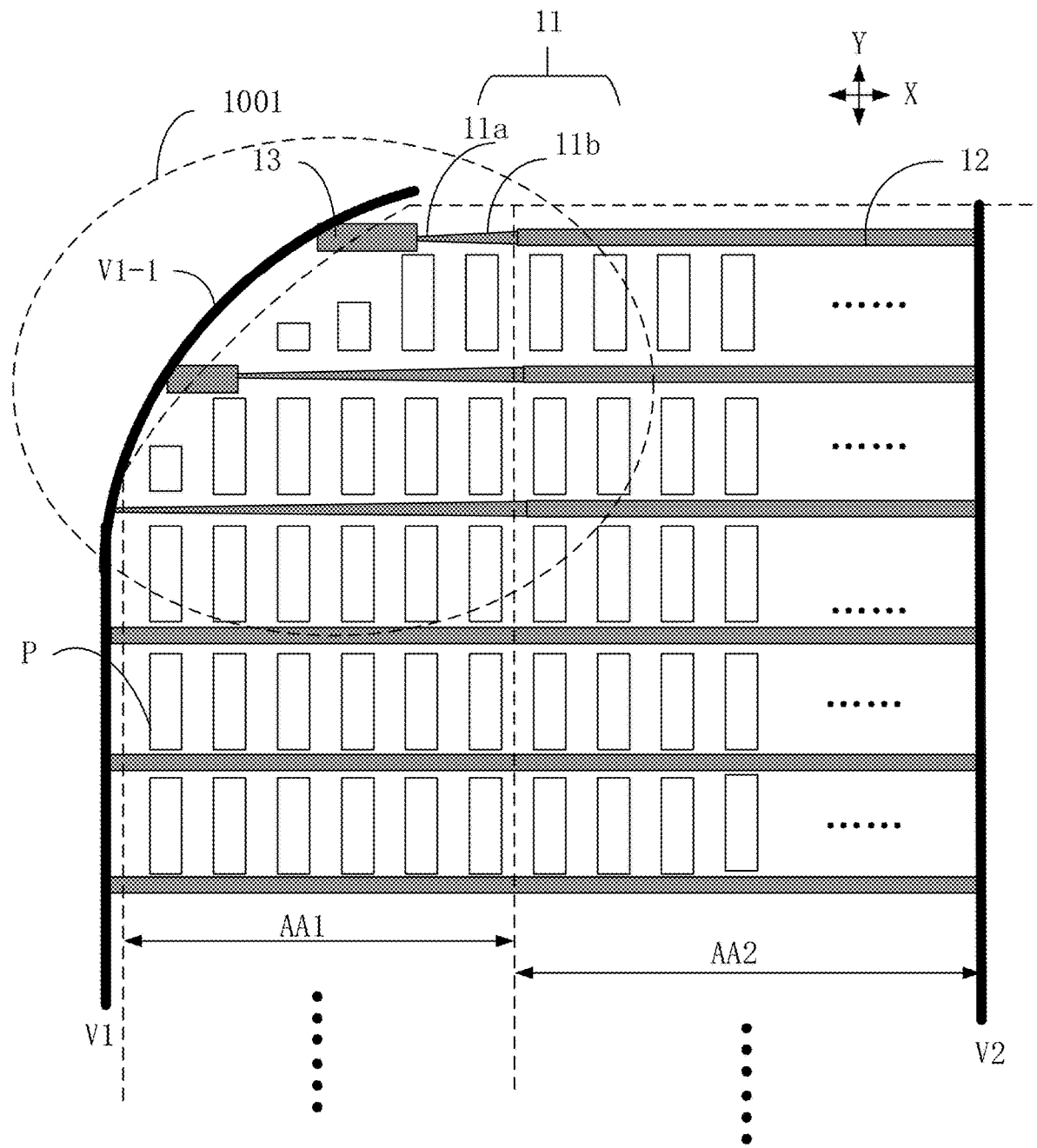

In one embodiment, the regular display region AA2 may have a rectangle shape, the portions of the first electrode wire V1 and the second electrode wire V2 disposed on both sides of the plurality of second heating wires 12 may be arranged in parallel and extended along the first direction, and the plurality of second heating wires 12 may be set to have an almost same length. The extension directions of the portions of the first electrode wire V1 and the second electrode wire V2 disposed on both sides of the plurality of first heating wires 11 may be determined according to the shape of the irregular display region AA1, which may be arranged in parallel (as shown in FIGS. 3-9), or non-parallel (as shown in FIG. 10, not illustrated). As shown in FIGS. 3-9, the lengths of the plurality of first heating wires 11 may often be different.

In another embodiment, the regular display region AA2 and the irregular display region AA1 may be arranged along the second direction, as shown in FIG. 10, the first direction may be the Y direction, and the second direction may be the X direction. In the plane formed by the X direction and the Y direction, the irregular display region AA1 may be located on the left side of the regular display region AA2. When the regular display region AA2 and the irregular display region AA1 are arranged along the second direction, the plurality of first heating wires 11 and the plurality of second heating wires 12 may be arranged in one-to-one correspondence. Every second heating wire 12 and the corresponding first heating wire 11 may be connected in series between the first electrode wire V1 and the second electrode wire V2. Such division method may be applied to the situation where the display panel 10 includes the corner region 1001. Based on such division method, the setting method of the first heating wire 11 in the corner region 1001 may be determined. The portions of the first electrode wire V1 and the second electrode wire V2 corresponding to the regular display region AA2 (for example, disposed in the regular display region AA2 or on both sides of the regular display region AA2) may be extended along the first direction, and the portions of the first electrode wire V1 and the second electrode wire V2 corresponding to the irregular display region AA1 (for example, disposed in the irregular display region AA1 or on both sides of the irregular display region AA1) may be determined according to the shape of the irregular display region AA1. In other words, the portions of the first electrode wire V1 and the second electrode wire V2 corresponding to the irregular display region AA1 may be arranged in parallel (as shown in FIGS. 3-9, not illustrated), or non-parallel (as shown in FIG. 10). The lengths of the plurality of second heating wires 12 may often be the same, and the lengths of the plurality of first heating wires 11 may often be different.

Based on the shape characteristics of the irregular display region AA1, the length of the first heating wire 11 may be greater than or smaller than the length of the second heating wire 12. In another embodiment, the length of a portion of the plurality of first heating wires 11 may be greater than the length of the second heating wire 12, and the length of another portion of the first heating wires 11 may be smaller than the length of the second heating wire 12. The disposure of the corner region 1001 may reduce the length of the first heating wire 11, while the disposure of the groove region 1002 may increase the length of the first heating wire 11.

Based on the above-disclosed different arrangement directions of the regular display region AA2 and the irregular display region AA1, the cases for the corner region 1001 and the groove region 1002 may be respectively described. It should be noted that in the following embodiments, the separate groove region 1002 or the separate corner region 1001 may be described. In practical applications, the display panel 10 may simultaneously include the groove region 1002 and the corner region 1001. For such display panel 10, the disposure method of the first heating wires 11 at the location of the groove region 1002 may be determined based on the method provided in Embodiment 1, and the disposure method of the first heating wires 11 at the location of the corner region 1001 may be determined based on the method provided in Embodiment 2. The boundary between the regular display region AA2 and the irregular display region AA1 may be set for ease of explanation, and may not actually exist in the display panel 10.

Exemplary Embodiment 1

In the case where the display panel 10 includes a groove region 1002, and the regular display region AA2 and the irregular display region AA1 are arranged along the first direction (using the Y direction as an example), the groove region 1002 may make the length of the target heating wire in the first heating wire 11 be greater than the length of the second heating wire 12. In view of this, the irregular display region AA1 may often be adjacent to other components disposed on the display panel 10, which may lead to inconsistent size of the irregular display region AA1 in the first direction. Therefore, the plurality of first heating wires 11 arranged along the first direction may be extended along the edge of the irregular display region AA1, which may lead to a longer length of the first heating wire compared to the second heating wire 12. In addition, to balance the heating efficiency of the regular display region AA2 and the irregular display region AA1, the average wire width of the target heating wire may be set larger than the average wire width of each of the plurality of second heating wires 12, which may reduce the resistance of the target heating wire to a certain extent, may improve the heating efficiency, and eliminate mura caused by a substantially large heat dissipation in the edge region. FIGS. 3-9 illustrate various schematic diagrams of arrangements of heating wires on the display panel 10 in the present disclosure.

The plurality of first heating wires 11 may be independently arranged one after the other, and each first heating wire may be connected between the first electrode wire V1 and the second electrode wire V2. In another embodiment, the plurality of first heating wires 11 may have a common segment in some regions. In one embodiment, all first heating wires 11 may have a common segment. In another embodiment, some first heating wires 11 may have a common segment. The common segment may often be located in the position where the size of the irregular display region AA1 is substantially small along the first direction, to reduce the required wiring area for such region, and may make the actual wiring area be adapted to the shape of the irregular display region AA1.

Figure 3:
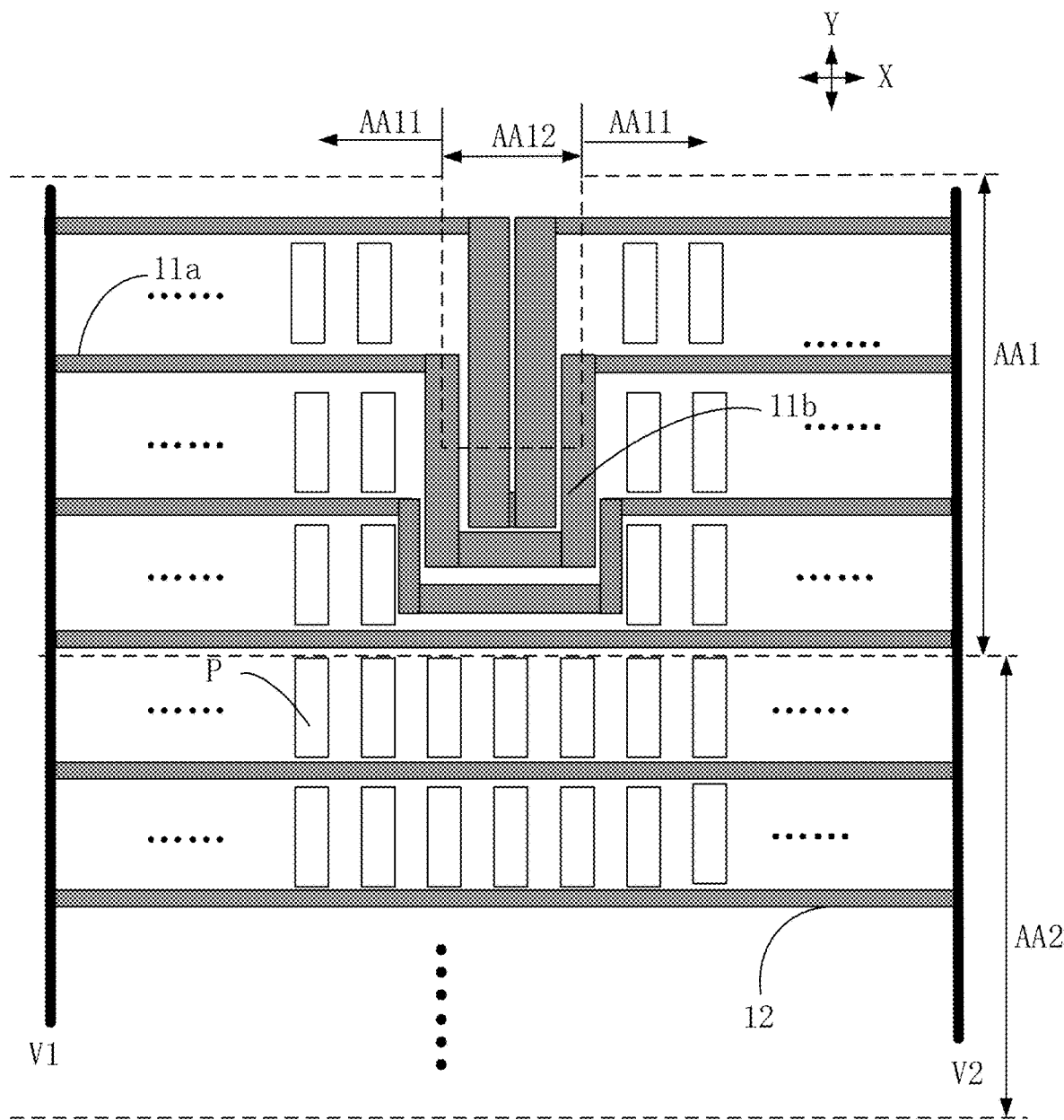
FIGS. 3-10 illustrate schematic diagrams of various display panels consistent with disclosed embodiments of the present disclosure.
Figure 4:
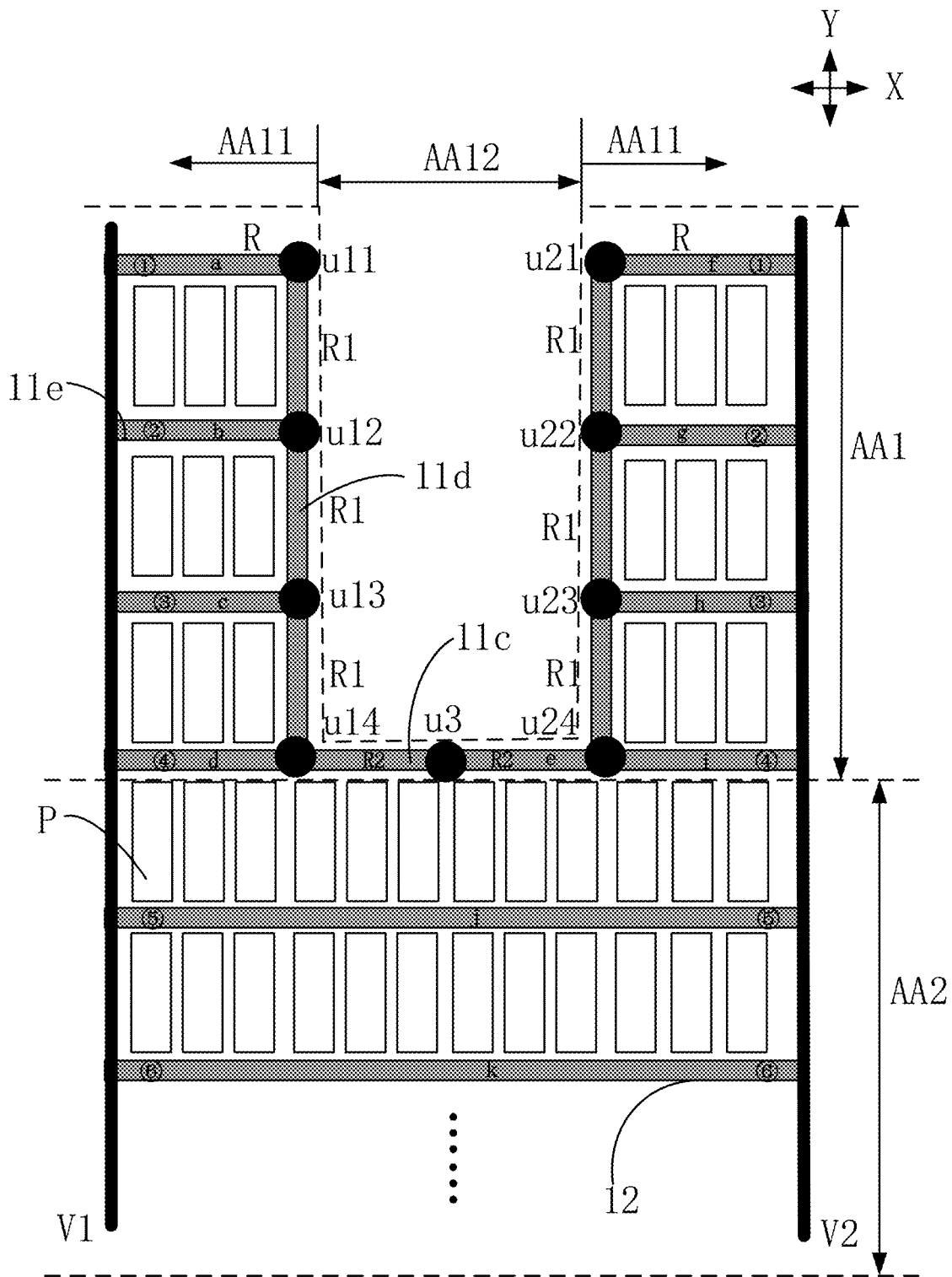

The irregular display region AA1 may be divided into a first region with a size along the first direction greater than the preset size, and a second region with a size along the first direction smaller than or equal to the preset size. In other words, along the first direction, the first region may be wider and the second region may be narrower. Referring to FIG. 3 and FIG. 4, the first region may refer to AA11 in the AA1 region, and the second region may refer to AA12 in the AA1 region. The preset size may be determined based on practical applications. Theoretically, the preset size may be any value smaller than the maximum size along the first direction of the irregular display region AA1. In practical applications, the preset size may be set to a substantially small value, which may often not exceed half of the maximum size along the first direction of the irregular display region AA1.

In an embodiment where the plurality of first heating wires 11 are independently arranged in sequence, as shown in FIG. 3, because the second region AA12 has a smaller space than the first region AA11, the spacing between adjacent first heating wires 11 in the second region AA12 may be smaller than the spacing between adjacent first heating wires 11 in the first region AA11, and the substantially small spacing between the plurality of first heating wires 11 in the second region AA12 may facilitate a substantially reasonable layout. In view of this, a portion of the second region AA12 may be closer to the regular display region AA2 than a portion of the first region AA11. Therefore, the first sub-segment 11b of the target heating wire with a wider wire width may be located in the second region AA12, while the second sub-segment 11a of the target heating wire with a narrower wire width may be located in the first region AA11.

Furthermore, in an embodiment where the plurality of first heating wires 11 are independently arranged in sequence, the first heating wire 11 that is farther away from the regular display region AA2 may be closer to the edge of the display panel 10, and thus may experience more heat dissipation. Additionally, the first heating wire 11 that is farther away from the regular display region AA2 may often have a substantially large length. Therefore, in the plurality of first heating wires 11, the width of the first sub-segment of the first heating wire 11 close to the regular display region AA2 may be smaller than the width of the first sub-segment of the first heating wire 11 farther away from the regular display region AA2. Such arrangement may facilitate increase of the temperature in different locations of the first heating wires 11, and improve the temperature uniformity of the irregular display region AA1 and the regular display region AA2.

In an embodiment where the plurality of first heating wires 11 have a common segment in a certain region, as shown in FIG. 4, at least two of the plurality of first heating wires 11 share a common segment 11c in the second region AA12. In other words, partial segments of at least two of the plurality of first heating wires 11 may be combined in the second region AA12, which may reduce the occupied border space of the heating wires. Furthermore, the aforementioned target heating wire may include the common segment 11c. In other words, the target heating wire consisting of the first sub-segment and the second sub-segment with different widths may refer to at least one of the at least two first heating wires 11 that have the common segment 11c. Further, the target heating wire may include a partial segment 11d non-perpendicular to the first direction in the first region AA11.

As shown in FIG. 4, the voltage of each node of the first electrode wire V1 may be denoted as VGH, and the voltage of each node of the second electrode wire V2 may be denoted as VGL. For ease of explanation, a pixel length may be taken as the unit length, and each pixel may include a plurality of pixel elements P. The length of each pixel may be the length of the plane occupied by the plurality of pixel elements P. Assuming that the plane occupied by the pixel formed by the combination of the plurality of pixel elements P may have equal length and width. The pixels may be arranged in an array in the display region AA, and the pixel elements P may be arranged in an array in the display region AA. For example, each pixel may include three pixel elements, and the plane occupied by each of the three pixel elements may have a rectangle shape. In other words, in the X direction, the length of the region where the three pixel elements are located may refer to one pixel length, and in the Y direction, the length of the region where one pixel element is located may refer to one pixel length.

For illustrative purposes, a display panel including 12 pixel elements P in the X-direction may be used as an example, in other words, the display panel may include four pixels. A resistance of each unit length of the common wire segment 11c may be denoted as R2, a resistance of each unit length of the partial segment 11d may be denoted as R1, and a resistance of each unit length of the other wire segment 11e in the first heating wire 11 and second heating wire 12 except for the common wire segment 11c and the partial wire segment 11d may be denoted as R. The heating wire may consist of six circuits in total, labeled as ①-⑥. Black circles may represent different node positions denoted as u11, u12, u13, u14, u21, u22, u23, u24, and u3 on the first heating wire. Each node may divide circuit thereof into a plurality of sections, and a, b, c, d, e, f, g, h, i, j, and k may represent a current in each section. Sections corresponding to a and f may belong to circuit ①, sections corresponding to b and h may belong to circuit ②, sections corresponding to c and h may belong to circuit ③, sections corresponding to d and i may belong to circuit ④, section corresponding to e may be the common wire segment for circuits ①②③④, section corresponding to j may belong to circuit ⑤, and section corresponding to k may belong to circuit ⑥. Because the circuit structure is left-right symmetrical, the voltage at node U3 may be calculated as (VGH−VGL)/2. Based on the consistency of node voltage at U12, a*(R+R1)=b*R. Based on the consistency of node voltage at U13, b*R+(a+b)*R1=c*R. Based on the consistency of node voltage at U14, c*R+(a+b+c)*R1=d*R. In addition, U3=d*R+(a+b+c+d)*R2=(VGH−VGL)/2, j=(VGH−VGL)/(4R)=k, and e=a+b+c+d. From these equations, it can be determined that d*R+(a+b+c+d)*R2=(VGH−VGL)/2=2R*j, and thus R2/R=(2j−d)/(a+b+c+d).

Based on the above equations and FIG. 4, due to the presence of R1, the currents in sections a, b, and c may be smaller than the current in section d. To achieve a small difference in generated heat amount between sections a, b, and c and sections d or j, R1 may need to be substantially small, and the region where R1 is located may have a wire width as large as possible or may be made of a material with a sheet resistance as small as possible. Furthermore, the current in section d may be slightly larger than the current in section j, to make the current in section a close to the current in section j. According to R2/R=(2j−d)/(a+b+c+d), in an embodiment where the difference between the currents in j and d is small or even the current in section d is greater than the current in section j, 2j−d may need to be less than or equal to d. In an embodiment where the difference between a, b, c and d is substantially small, a+b+c+d may be close to 4d, such that R2/R may need to be less than 1. The smaller the value of R2, the larger the value of a+b+c+d, and the more likely the current in section a closing to the current in section j, such that R2 may need to be small enough. Such rules may also apply to a display panel with different quantity of pixels. Based on this, the first heating wires 11 may be disposed as follows.

Figure 5:
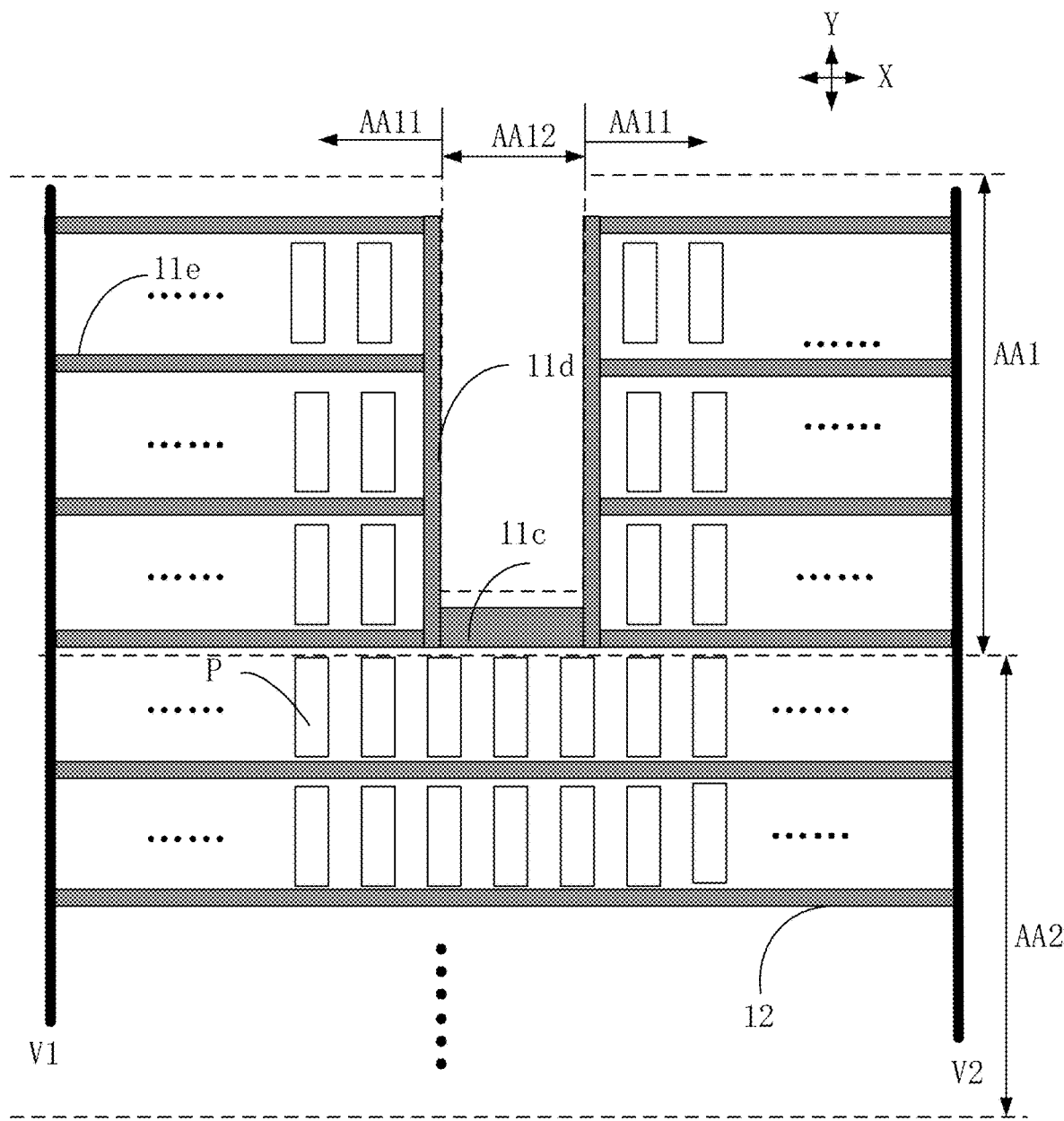

In one embodiment, if the first sub-segment is closer to the regular display region AA2 than the second sub-segment, the first sub-segment with a larger wire width may include the common segment 11c, and the second sub-segment with a smaller wire width may be located in the first region AA11. As shown in FIG. 5, the common segment 11c in the first sub-segment may be closer to the regular display region AA2 than the second sub-segment, and the increase in wire width of the common segment 11c may reduce the resistance of the corresponding first heating wire 11 and increase the current in the corresponding first heating wire 11. In view of this, for the unit length of the first heating wire 11, the second sub-segment may have a larger voltage drop than the first sub-segment per unit length, such that the second sub-segment may have a higher heating efficiency at the corresponding location. The segments in the second region AA12 that are not common segment 11c may also belong to the first sub-segment, and may be closer to the regular display region AA2 than the second sub-segment. For example, the wire width of the common segment 11c may be ten times the wire width of the second sub-segment.

Figure 6:
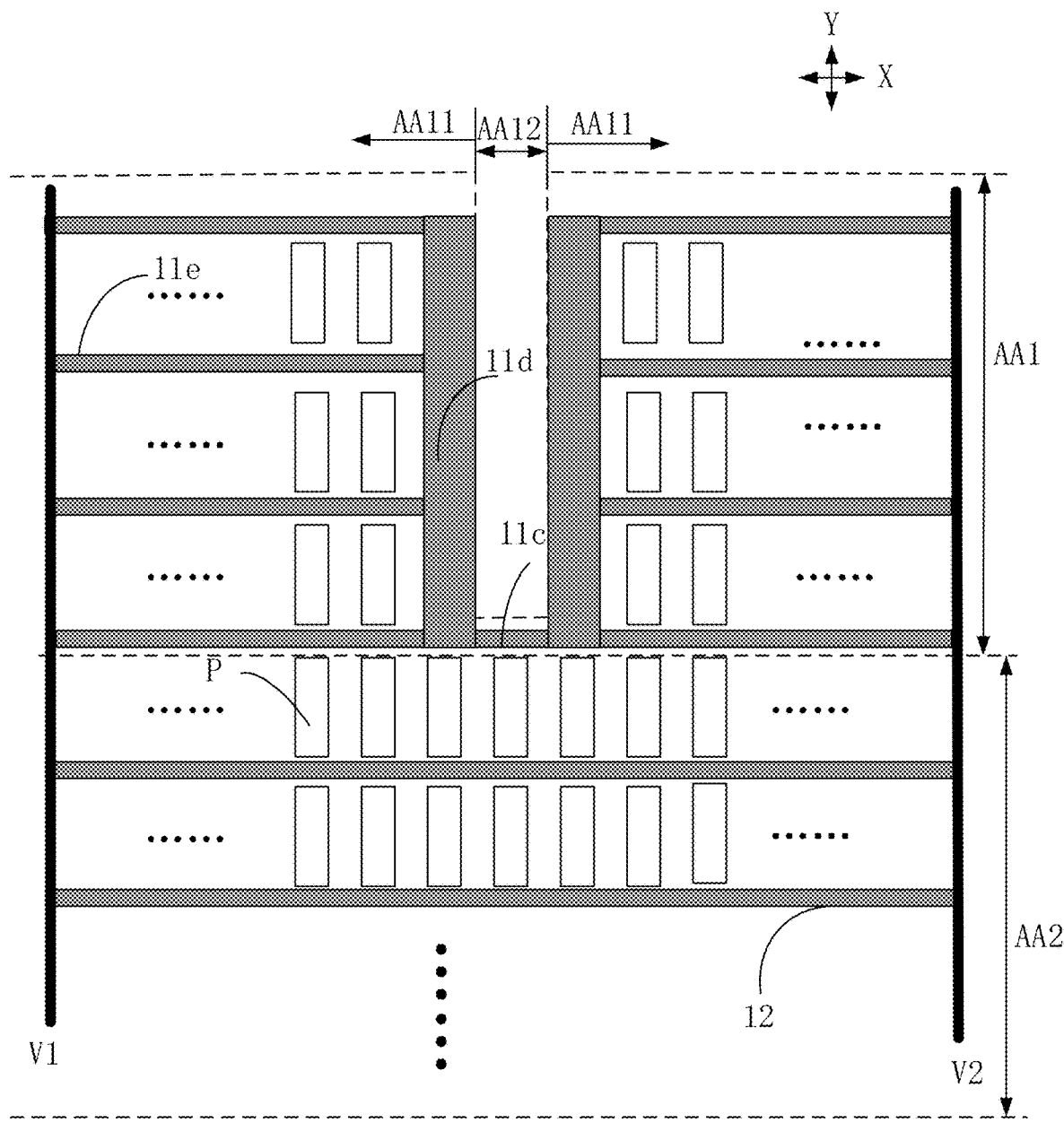

In practical applications, the target heating wire may include a partial segment that is non-perpendicular to the first direction in the first region AA11, and the first sub-segment may include the partial segment 11d. In other words, the partial segment that is non-perpendicular to the first direction may have a substantially large wire width. As shown in FIG. 6, the partial segment 11d may be farther away from the regular display region AA2 than other sub-segments in the first sub-segment, such that the voltage drop per unit length of the partial segment 11d may be substantially small. The other sub-segment 11e in the first sub-segment except for the partial segment 11d may refer to the second sub-segment, and the voltage drop per unit length of the second sub-segment may be substantially large. Therefore, the second sub-segment may have a substantially high heating efficiency. For example, the wire width of the partial segment 11d may be 500 times the wire width of the other sub-segment 11e.

Moreover, at least two of the first heating wires 11 may be connected to the common segment 11c through a same partial segment 11d. In other words, the partial segment 11d non-perpendicular to the first direction may be shared by different first heating wires 11, which may save the wiring region and reduce the resistance of the first heating wires 11.

Figure 7:
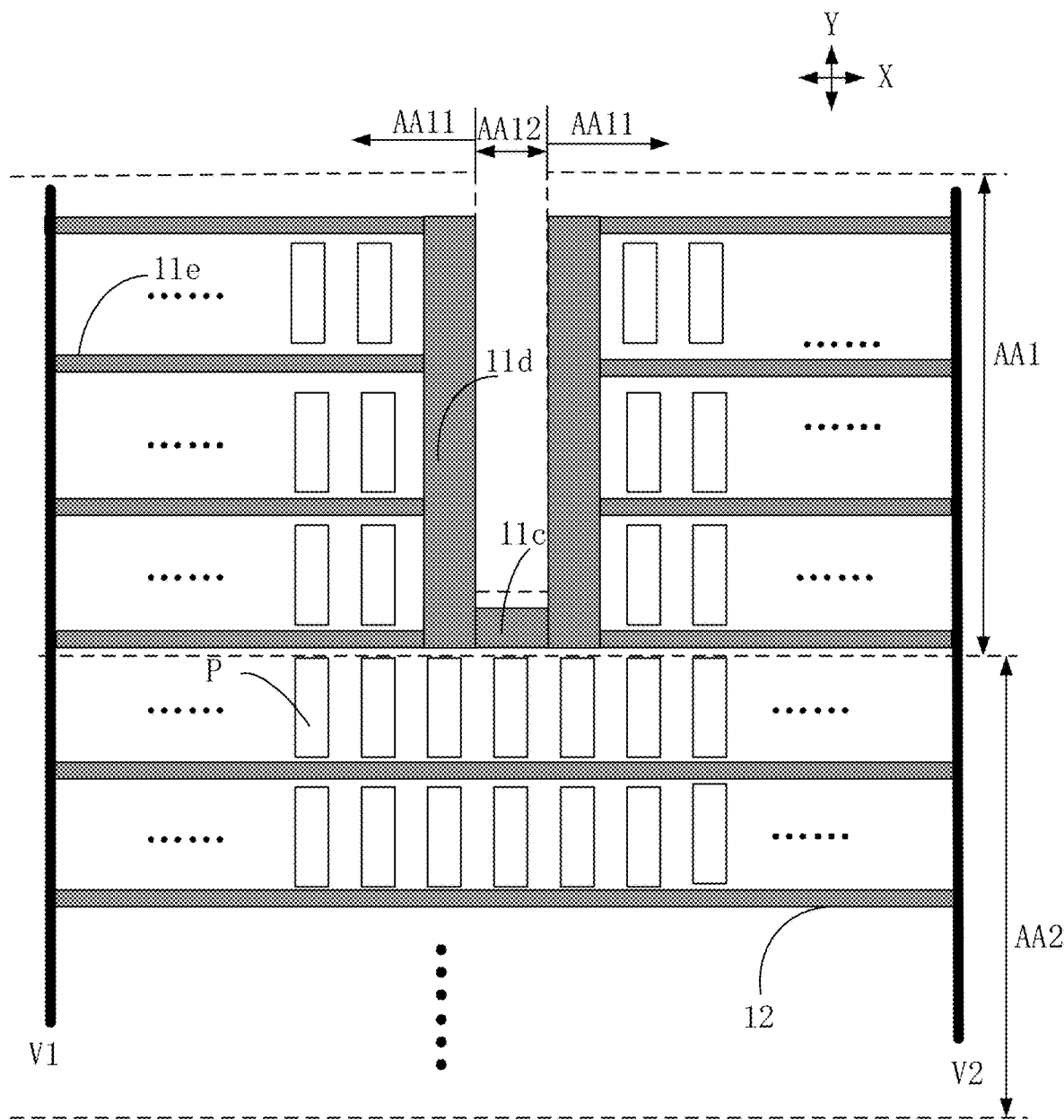

The first sub-segment may simultaneously include the common segment 11c and the partial segment 11d non-perpendicular to the first direction, as shown in FIG. 7. The resistance of the target heating wire may be further reduced, and the current of the target heating wire may be further increased, thus improving the heating efficiency of the target heating wire.

Figure 8:
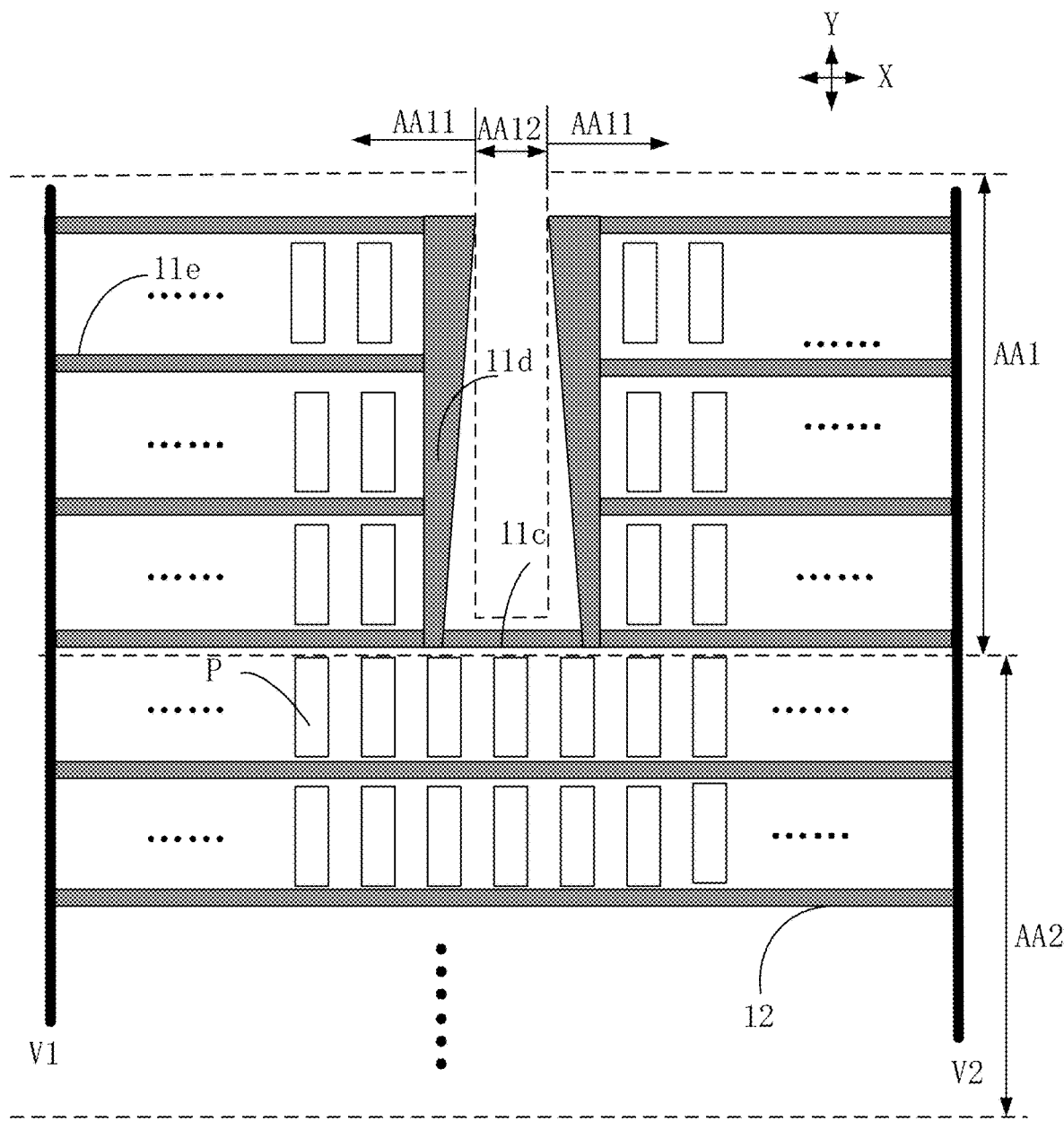

In a direction pointing from the irregular display region AA1 to the regular display region AA2, the width of the partial segment 11d may gradually decrease, such that the first heating wire 11 far from the regular display region AA2 may have a substantially small resistance, as shown in FIG. 8. In another embodiment, in the direction pointing from the irregular display region AA1 to the regular display region AA2, the width of the partial segment 11d may gradually increase, such that the portion shared by one or more first heating wires 11 may have a substantially large wire width, such that the resistance per unit length may be substantially small, which may facilitate the increase of current of each first heating wire 11.

The partial segment 11d may be extended along the first direction or disposed along the edge of the irregular display region AA1. The common segment 11c may be disposed along the edge of the irregular display region AA1 or extended in the direction perpendicular to the first direction. The edge of the irregular display region AA1 may often be set according to the shape of the adjacent non-display region and may have a broken-line shape or a curved-line shape.

Referring to FIGS. 3-8, the partial segment 11d may be extended along the first direction, and the common segment 11c may be extended along the second direction perpendicular to the first direction. The edge of the irregular display region AA1 may have a broken-line shape. In other words, the partial segment 11d and the common segment 11c may be disposed along the edge of the irregular display region AA1. Referring to FIG. 9, the partial segment 11d may be disposed along the edge of the irregular display region AA1, and may have a curved shape. The common segment 11c may be disposed along the edge of the irregular display region AA1, and may have a curved shape. The edge of the irregular display region AA1 may have a curved-line shape.

In one embodiment, the wire width of the first sub-segment may be greater than the wire width of the plurality of second heating wires 12, and the wire width of the second sub-segment may be equal to the wire width of the plurality of second heating wires 12. Therefore, the average wire width of the target heating wire may be greater than the wire width of the plurality of second heating wires 12. The wire width of each second heating wire 12 of the plurality of second heating wires 12 may be uniform, and the wire widths of different second heating wires 12 may be the same.

In one embodiment, the irregular display region AA1 may include a pixel region with a pixel array and a non-pixel region without a pixel array. The pixel array may include pixel elements P arranged in an array. The first sub-segment may be located in the non-pixel region, and at least a portion of the second sub-segment may be located in the pixel region. The second sub-segment with a wire width consistent with the second heating wire 12 may have a similar effect on the display performance as the second heating wire 12, which may improve the display uniformity of the display panel 10.

In one embodiment, both the first electrode wire V1 and the second electrode wire V2 may be extended along the first direction. Both the first heating wire 11 and the second heating wire 12 may be located between the first electrode wire V1 and the second electrode wire V2, such that the first heating wire 11 and the second heating wire 12 may be connected to different positions of the first electrode wire V1 and the second electrode wire V2, respectively.

The first heating wire 11 may be connected to the first electrode wire V1 or the second electrode wire V2 through a connection wire in the non-display region, and the second heating wire 12 may also be connected to the first electrode wire V1 or the second electrode wire V2 through a connection wire in the non-display region. The first heating wire 11 and the second heating wire 12 may be disposed between the pixel elements P, to avoid excessive impact on the display performance.

Exemplary Embodiment 2

In an embodiment where the display panel 10 includes a corner region 1001, when the regular display region AA2 and the irregular display region AA1 are arranged along the second direction, the corner region 1001 may cause the lengths of the target heating wires in the first heating wires 11 to be uneven. FIG. 10 illustrates a schematic diagram of the display panel. In one embodiment, the plurality of first heating wires 11 and the plurality of second heating wires 12 may be arranged in one-to-one correspondence, and each of the plurality of second heating wires 12 may be connected in series with the corresponding first heating wires 11 between the first electrode wire V1 and the second electrode wire V2.

At least one of the first electrode wire V1 and the second electrode wire V2 may include a sub-electrode wire V1-1 disposed along the edge of the irregular display region AA1, referring to the portion of V1 that does not extend along the first direction (Y direction), as shown in FIG. 10. The sub-electrode wire V1-1 may be configured to connect the plurality of first heating wires 11. A sum of the length of the target heating wire and the second heating wire 12 corresponding to the target heating wire may be smaller than or equal to a sum of the maximum size of the irregular display region AA1 along the second direction and the size of the regular display region AA2 along the second direction (e.g., the maximum size of the display region AA in the second direction (X direction) shown in FIG. 10). The average wire width of the target heating wire may be smaller than the average wire width of each of the plurality of second heating wires 12. In other words, the heating wire with a substantially small length among the first heating wires 11 may refer to the target heating wire. The first heating wire with a substantially small wire width may make the target heating wire have a substantially large voltage drop, may improve the heating efficiency of the target heating wire, and overcome the problem of fast heat dissipation in the edge region.

The wire width of the target heating wire may gradually increase in the direction pointing from the irregular display region AA1 to the regular display region AA2 (e.g., the second direction), forming a gradient trend. In view of this, the first sub-segment 11b and the second sub-segment 11a may refer to two non-overlapping segments, and the first sub-segment 11b may be closer to the regular display region AA2 than the second sub-segment 11a. The wire width of the target heating wire may also change at certain positions, such that the target heating wire may include a plurality of sub-segments with different wire widths, one of which may be used as the first sub-segment 11b and the other one of which may be used as the second sub-segment 11a. The first sub-segment 11b may be closer to the regular display region AA2 than the second sub-segment 11a.

In one embodiment, a connection wire 13 may be disposed between the target heating wire and the sub-electrode wire. The connection wire 13 may be disposed in the non-display region NA or the irregular display region AA1. The average wire width of the connection wire 13 may be greater than or equal to the average wire width of the target heating wire, as shown in FIG. 10. The voltage drop at the position of the connection wire 13 may avoid substantially large, which may improve the overall current of the target heating wire, and may prevent reducing the heating efficiency of the first sub-segment 11b in the target heating wire. If the connection wire 13 is located near or within the irregular display region AA1, the average wire width of the connection wire 13 may be smaller than the average wire width of the target heating wire, which may make the connection wire 13 have a substantially large resistance and a substantially large heating efficiency, and, thus, may assist in heating the edge of the irregular display region AA1 and balance the temperature in different locations of the display panel.

In one embodiment, the wire width of the first sub-segment may be equal to the wire width of the plurality of second heating wires 12, and the wire width of the second sub-segment may be smaller than the wire width of the plurality of second heating wires 12. Therefore, the region of the first sub-segment and the region of the second heating wires 12 may have a similar display effect, which may prevent the excessive impact of the heating electrode layer on the display effect.

The present disclosure provides a display panel. The display panel may include the regular display region and the irregular display region. The display panel may also include the first substrate and the second substrate that are disposed opposite to each other, the liquid crystal layer located between the first substrate and the second substrate, and the heating electrode layer stacked with the liquid crystal layer. The heating electrode layer may heat the liquid crystal layer. In the irregular display region, the heating electrode layer may include the plurality of first heating wires, and each of the plurality of first heating wires may be connected between the first electrode wire and the second electrode wire. The first electrode wire and the second electrode wire may be applied with different voltages, such that the heating electrode layer may generate heat when being powered on. At least one first heating wire of the plurality of first heating wires may serve as the target heating wire, and the target heating wire may include the first sub-segment and the second sub-segment. The resistance per unit length of the first sub-segment may be smaller than the resistance per unit length of the second sub-segment. The first sub-segment may be closer to the regular display region than the second sub-segment. In other words, for the first heating wire in the irregular display region, the same first heating wire may have non-uniform resistance per unit length. The first sub-segment close to the regular display region may have a substantially small resistance per unit length, while the second sub-segment far from the regular display region may have a substantially large resistance per unit length. Therefore, when the same current is applied to different positions on the same heating wire, the second sub-segment far from the regular display region may have a higher heating power compared to the first sub-segment close to the regular display region, which may improve the heating uniformity at different positions of the irregular display region when there is a substantially large heat dissipation in a position far from the regular display region.

Figure 11:
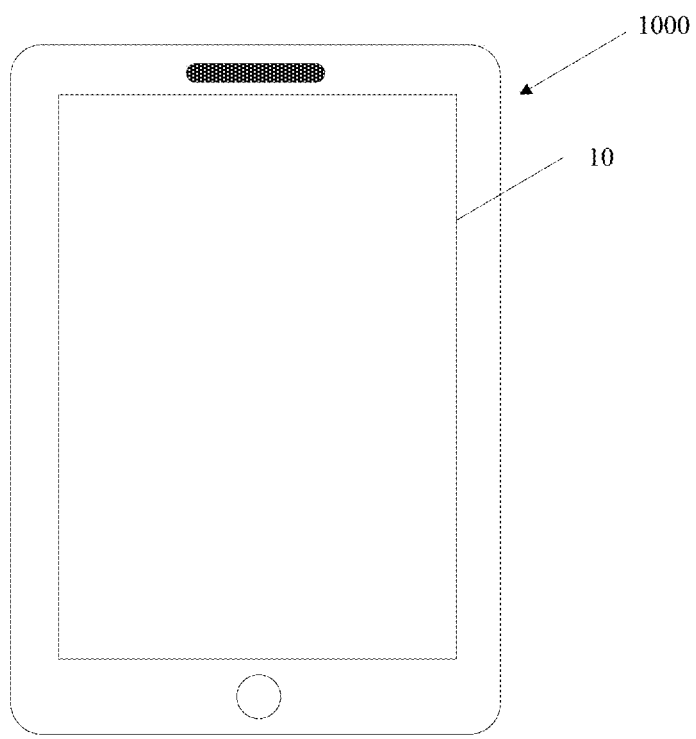
FIG. 11 illustrates a schematic diagram of an exemplary display device consistent with disclosed embodiments of the present disclosure.

The present disclosure also provides a display device. FIG. 11 illustrates a schematic diagram of a display device consistent with disclosed embodiments of the present disclosure. Referring to FIG. 11, a display device 1000 may include the above-disclosed display panel 10. The display device 1000 may include but may not be limited to devices with display functions such as a mobile phone, a personal digital assistant (PDA), a tablet computer, an e-reader, a television, an access control system, a smart fixed telephones, and a console, etc.

The various embodiments in the present specification are described in a progressive manner. Each embodiment mainly describes in terms of differences from other embodiments, and the same or similar parts between the various embodiments may be referred to each other. In particular, because the embodiment of display device is fundamentally similar to the embodiment of display panel, the description of the embodiment of display device may be substantially simple, and the relevant aspects may be referred to the corresponding part of the embodiment of display panel.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel, comprising:
   a regular display region and an irregular display region that includes one or more of a curved corner region or groove region;
   a first substrate and a second substrate that are disposed opposite to each other;
   a liquid crystal layer disposed between the first substrate and the second substrate; and
   a heating electrode layer stacked with the liquid crystal layer, wherein:
   in the irregular display region, the heating electrode layer includes a plurality of first heating wires, each of the plurality of first heating wires is connected between a first electrode wire and a second electrode wire, and the first electrode wire and the second electrode wire are applied with different voltages,
   at least one of the plurality of first heating wires serves as a target heating wire, and the target heating wire includes a first sub-segment and a second sub-segment, wherein a resistance per unit length of the first sub-segment is smaller than a resistance per unit length of the second sub-segment, and the first sub-segment is closer to the regular display region than the second sub-segment, and
   in the regular display region, the heating electrode layer includes a plurality of second heating wires that each is connected between the first electrode wire and the second electrode wire and has a same width and thickness throughout each second heating wire, and an average wire width of the target heating wire in the irregular display region is different from an average wire width of each of the plurality of second heating wires in the regular region.

2. The display panel according to claim 1, wherein:
a wire width of the first sub-segment is greater than a wire width of the second sub-segment.

3. The display panel according to claim 2, wherein:
the regular display region and the irregular display region are arranged along a first direction, and the regular display region has a rectangle shape
each of the plurality of second heating wires is connected between the first electrode wire and the second electrode wire, and
the plurality of first heating wires are arranged along the first direction, and the plurality of second heating wires are arranged along the first direction.

4. The display panel according to claim 3, wherein:
a length of the target heating wire is greater than a length of each of the plurality of second heating wires, and
the average wire width of the target heating wire is greater than the average wire width of each of the plurality of second heating wires.

5. The display panel according to claim 4, wherein:
the irregular display region includes a first region with a size along the first direction greater than a preset size, and a second region with a size along the first direction smaller than or equal to the preset size, wherein at least two of the plurality of first heating wires share a common segment in the second region, and the target heating wire includes the common segment.

6. The display panel according to claim 5, wherein:
the first sub-segment includes the common segment, and the second sub-segment is located in the first region.

7. The display panel according to claim 5, wherein:
the target heating wire includes a partial segment non-perpendicular to the first direction in the first region, and the first sub-segment includes the partial segment.

8. The display panel according to claim 7, wherein:
at least two of the plurality of first heating wires are connected to the common segment through a same partial segment.

9. The display panel according to claim 7, wherein:
in a direction pointing from the irregular display region to the regular display region, a wire width of the partial segment gradually decreases.

10. The display panel according to claim 7, wherein:
the partial segment is extended along the first direction or disposed along an edge of the irregular display region, the common segment is disposed along the edge of the irregular display region or extended along a direction perpendicular to the first direction.

11. The display panel according to claim 4, wherein:
the irregular display region includes a first region with a size along the first direction greater than a preset size, and a second region with a size along the first direction smaller than or equal to the preset size, wherein:
a spacing between adjacent two first heating wires of the plurality of first heating wires in the second region is smaller than a spacing between adjacent two first heating wires of the plurality of first heating wires in the first region, and
the first sub-segment is located in the second region, and the second sub-segment is located in the first region.

12. The display panel according to claim 11, wherein:
among the plurality of first heating wires, a wire width of the first sub-segment of a first heating wire of the plurality of first heating wires close to the regular display region is smaller than a wire width of the first sub-segment of another first heating wire of the plurality of first heating wires farther away from the regular display region.

13. The display panel according to claim 3, wherein:
the wire width of the first sub-segment is greater than a wire width of each of the plurality of second heating wires, and the wire width of the second sub-segment is equal to the wire width of each of the plurality of second heating wires.

14. The display panel according to claim 13, wherein:
the irregular display region includes a pixel region with a pixel array and a non-pixel region without a pixel array, wherein the first sub-segment is located in the non-pixel region, and at least a portion of the second sub-segment is located in the pixel region.

15. The display panel according to claim 3, wherein:
both the first electrode wire and the second electrode wire are extended along the first direction.

16. The display panel according to claim 2, wherein:
the regular display region and the irregular display region are arranged along a second direction, and the regular display region has a rectangle shape,
the plurality of first heating wires and the plurality of second heating wires are arranged in one-to-one correspondence,
every second heating wire of the plurality of second heating wires and a corresponding first heating wire of the plurality of first heating wires are connected in series between the first electrode wire and the second electrode wire, and
the plurality of first heating wires are arranged along a first direction perpendicular to the second direction, and the plurality of second heating wires are arranged along the first direction.

17. The display panel according to claim 16, wherein:
at least one of the first electrode wire and the second electrode wire includes a sub-electrode wire disposed along an edge of the irregular display region, and the sub-electrode wire is configured to connect the plurality of first heating wires;
a sum of a length of the target heating wire and a length of the second heating wire corresponding to the target heating wire is smaller than or equal to a sum of a maximum size of the irregular display region along the second direction and a size of the regular display region along the second direction; and
the average wire width of the target heating wire is smaller than the average wire width of each of the plurality of second heating wires.

18. The display panel according to claim 17, wherein:
a connection wire is disposed between the target heating wire and the sub-electrode wire, and an average wire width of the connection wire is greater than or equal to an average wire width of the target heating wire.

19. The display panel according to claim 16, wherein:
the wire width of the first sub-segment is equal to a wire width of each of the plurality of second heating wires, and the wire width of the second sub-segment is smaller than the wire width of each of the plurality of second heating wires.

20. A display device, comprising:
a display panel, the display panel including:
a regular display region and an irregular display region that includes one or more of a curved corner region or groove region;
a first substrate and a second substrate that are disposed opposite to each other;
a liquid crystal layer disposed between the first substrate and the second substrate; and
a heating electrode layer stacked with the liquid crystal layer, wherein:
in the irregular display region, the heating electrode layer includes a plurality of first heating wires, each of the plurality of first heating wires is connected between a first electrode wire and a second electrode wire, and the first electrode wire and the second electrode wire are applied with different voltages, and
at least one of the plurality of first heating wires serves as a target heating wire, and the target heating wire includes a first sub-segment and a second sub-segment, wherein a resistance per unit length of the first sub-segment is smaller than a resistance per unit length of the second sub-segment, and the first sub-segment is closer to the regular display region than the second sub-segment, and
in the regular display region, the heating electrode layer includes a plurality of second heating wires that each is connected between the first electrode wire and the second electrode wire and has a same width and thickness throughout each second heating wire, and an average wire width of the target heating wire in the irregular display region is different from an average wire width of each of the plurality of second heating wires in the regular region.

* * * * *